United States Patent [19]

Kubota

[11] Patent Number: 4,899,245
[45] Date of Patent: Feb. 6, 1990

[54] METHOD OF CHECKING MAGNETIC TAPE CASSETTE LID OPENING OPERATION

[75] Inventor: Kazuo Kubota, Kanagawa, Japan

[73] Assignee: Fuji Photo Film Co., Ltd., Kanagawa, Japan

[21] Appl. No.: 212,380

[22] Filed: Jun. 27, 1988

[30] Foreign Application Priority Data

Jul. 1, 1987 [JP] Japan ................................ 62-164688

[51] Int. Cl.$^4$ ............................................ G11B 23/00
[52] U.S. Cl. ..................................................... 360/137
[58] Field of Search ......................................... 360/137

[56] References Cited

FOREIGN PATENT DOCUMENTS

| 0004844 | 3/1979 | Japan . | |
|---|---|---|---|
| 0175172 | 10/1983 | Japan . | |
| 0151865 | 8/1985 | Japan | 360/137 |
| 0151866 | 8/1985 | Japan | 360/137 |
| 0254449 | 11/1986 | Japan . | |

Primary Examiner—A. J. Heinz
Assistant Examiner—David J. Severin
Attorney, Agent, or Firm—Sughrue, Mion, Zinn, Macpeak & Seas

[57] ABSTRACT

A videotape cassette is provided with a cassette cover which is mounted on a cassette casing to be movable between a closed position and an open position and is urged toward the closed position by a closing spring. Further, the cassette casing is provided with a lock mechanism which prevents the cover from being accidentally opened when the cassette is free. The lock mechanism comprises a lock member which is movable between a locking position in which it is engaged with the cassette cover in the closed position to lock the cassette cover to the closed position, and a lock releasing position in which it releases the cassette cover, and a locking spring which normally urges the lock member toward the locking position. In order to check whether the cover can be correctly opened and closed, the lock member is first urged toward the lock releasing position and then released. Then the cover is urged toward the open position and then released. Thereafter the position of the cover is detected. Thereafter, the lock member is moved to the lock releasing position, and with the lock member held in the lock releasing position, the cover is brought to the open position and then released. Then the position of the cover is detected.

1 Claim, 3 Drawing Sheets

METHOD OF CHECKING MAGNETIC TAPE CASSETTE LID OPENING OPERATION

BACKGROUND OF THE INVENTION

1. Field of the Invention

This invention relates to a method of and a system for checking opening and closing function of a cassette cover which covers an opening of the cassette through which the recording and reproducing system has access to the tape.

2. Description of the Prior Art

Generally, a videotape cassette is provided with an opening at the front end face for giving the recording and reproducing system access to the tape, and a cassette cover is provided to cover the opening. The cassette cover is mounted on the cassette casing to be movable between a closed position and an open position and is spring-urged toward the closed position. When the cassette is free (being not loaded in the recording and reproducing system), the cassette cover is in the closed position under the force of the spring. On the other hand, when the cassette is loaded in the recording and reproducing system, the cassette cover is moved to the open position by the cover opening mechanism of the recording and reproducing system overcoming the force of the spring. Further, the cassette casing is provided with a lock mechanism which prevents the cover from being accidentally opened when the cassette is free. The lock mechanism comprises a lock member which is movable between a locking position in which it is engaged with the cassette cover in the closed position to lock the cassette cover to the close position, and a lock releasing position in which it releases the cassette cover, and a spring which normally urges the the lock member toward the locking position. The lock member is moved to the lock releasing position overcoming the force of the spring by the releasing mechanism of the recording and reproducing system when the cassette is loaded therein.

Accordingly, the cassette cover must be checked for whether it can be correctly opened and closed in the manufacturing process of the tape cassette. Conventionally this check has been effected by an organoleptic test by manually opening and closing the cover. However, the organoleptic test is disadvantageous in that result of the check fluctuates depending on the examiner to adversely affect the quality of the products and examiners are required, thereby adding to the manufacturing costs.

SUMMARY OF THE INVENTION

In view of the foregoing observations and description, the primary object of the present invention is to provide a method of and a system for automatically checking the magnetic tape cassette for whether the cassette cover can be correctly opened and closed.

In accordance with the present invention, the lock member is first urged toward the lock releasing position and then released. When the lock member and the locking spring (the spring urging the lock member toward the locking position) have been correctly incorporated in the casing body, the lock member returns to the locking position when it is released. Otherwise the lock member cannot return to the locking position. This is checked later as will become apparent later. Then the cover is urged toward the open position and then released. Thereafter the position of the cover is detected. When the lock member has correctly returned to the lock position, the cover cannot be moved since the cover is locked by the lock member. On the other hand, when the locking spring and the lock member have not been correctly incorporated and the lock member has not returned to the lock position, the cover is moved to the open position. Thereafter, the lock member is moved to the lock releasing position, and with the lock member held in the lock releasing position, the cover is brought to the open position and then released. Then the position of the cover is detected. At this time, if the cover and the closing spring (the spring urging the cover) have been correctly incorporated in the casing body, the cover returns to the closed position under the force of the closing spring when it is released. Otherwise, the cover cannot return to the closed position.

DESCRIPTION OF THE PREFERRED EMBODIMENT

Figure 1:
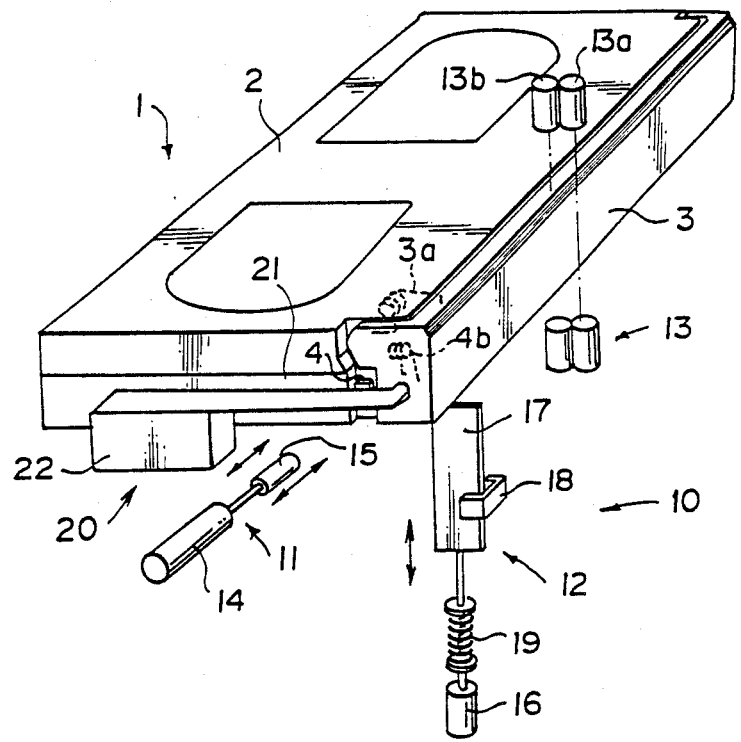
FIG. 1 is a perspective view of a magnetic tape cassette checking system in accordance with an embodiment of the present invention.
Figure 2:
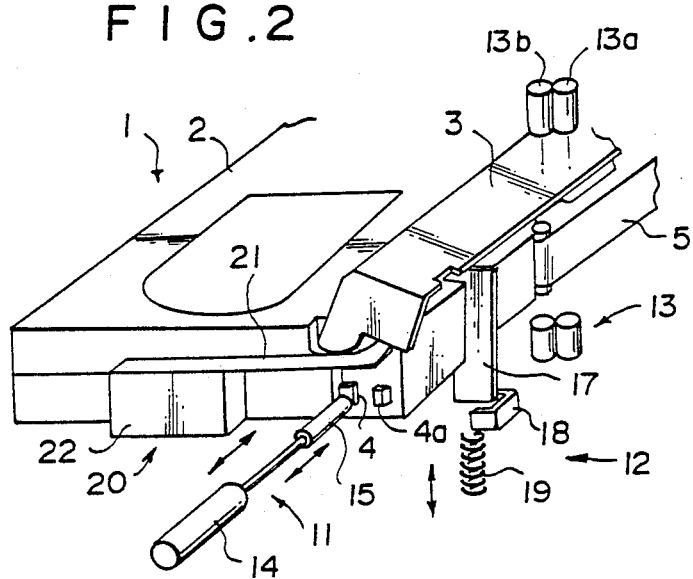
FIG. 2 is a perspective view showing the same but in a different state.

In FIGS. 1 and 2, a videotape cassette 1 comprises a casing body 2, a cassette cover 3 and a lock member 4. The casing body 2 has an opening at the front end face thereof for giving a recording and reproducing system access to the videotape 5 accommodated therein, and the cassette cover 3 is mounted on the casing body 2 to be pivoted between a closed position in which it closes the opening and an open position in which it opens the opening. The cassette cover 3 is urged toward the closed position by a closing spring 3a. The lock member 4 has an engagement piece 4a and is mounted on the casing body 2 to be pivoted between a locking position in which the engagement piece 4a is engaged with the cover 3 in the closed position to lock the cover there, and a releasing position in which the engagement piece 4a releases the cover 3. The lock member is urged toward the locking position by a locking spring 4b. Accordingly, when the videotape cassette 1 is free, i.e., when no external force acts on the cassette 1, the cover 3 is in the closed position and the lock member 4 is in the locking position as shown in FIG. 1.

A magnetic tape cassette checking system 10 in accordance with an embodiment of the present invention is provided with a lock releasing means 11, a cover opening means 12 and a position detecting means 13, and checks whether the cover 3 can be correctly opened and closed while the cassette 1 is positioned as shown in FIG. 1.

The lock releasing means 11 comprises a cylinder 14 and a lock releasing pin 15 which is moved back and forth by the cylinder 14 and is adapted to push the lock member 4 to the releasing position. The lock releasing pin 15 is connected to the cylinder 14 by way of a damper spring (not shown) so that the pushing force on the locking member 4 is limited to a predetermined level.

The cover opening means 12 comprises a cylinder 16, a cover opening plate 17 which is moved up and down by the cylinder 16, a photoelectric switch 18 disposed near the plate 17, and a damper spring 19 connecting the plate 17 with the cylinder 16, and is adapted to push the cover 3 to the open position. The photoelectric switch 18 is disposed to be closed when the cover opening plate 17 is moved to the position in which the cover 3 is held in the open position as shown in FIG. 2. The damper spring 19 is compressed when the compressive force acting thereon exceeds a predetermined level, thereby limiting the pushing force on the cover 3, so that the cover 3 is not broken even if the cylinder 16 is actuated to push the cover 3 toward the open position when the cover 3 is locked by the lock member 4.

The position detecting means 13 comprises two pairs of photoelectric switches 13a and 13b and detects that the cover 3 is in the closed position. That is, when the cover 3 in the closed position, the photoelectric switch 13a is closed while the photoelectric switch 13b is opened as shown in FIG. 1. On the other hand, when the cover 3 is not in the closed position, both the switches 13a and 13b are opened. Further, when the cover 3 is not mounted on the casing body 2 by accident, both the switches 13a and 13b are opened.

The checking system of this embodiment is further provided with a holding means 20 comprising a lever 21 and a support 22 for supporting the lever 21. The holding means 20 is moved by a cam (not shown) between a holding position in which the free end portion of the lever 21 is brought into engagement with the cover 3 to hold the cover 3 in the open position and a releasing position in which the lever 21 releases the cover 3. By holding the cover 3 in the open position by the holding means 20, check on the function of the cover 3 can be effected during the step of taking up the magnetic tape 5 in the manufacturing process of the cassette 1.

The operation of the checking system of this embodiment ill be described, hereinbelow.

After the cassette 1 is set in the predetermined position with respect to the checking system as shown in FIG. 1, the lock releasing means 11 is first operated. That is, the cylinder 14 moves forth the lock releasing pin 15 to push the lock member 4 to the releasing position and back to release the lock member 4. When the lock member 4 and the locking spring 4b have been correctly incorporated in the casing body 2, the lock member 4 returns to the locking position when the lock releasing pin 15 releases the lock member 4. Otherwise the lock member 4 cannot return to the locking position. This is checked later as will become apparent later.

Then the cover opening means 12 is operated. That is, the cover opening plate 17 is moved up and down to once push the cover 3 toward the open position and then release it. When the lock member 4 has correctly returned to the lock position, the damper spring 19 of the cover opening plate 17 is compressed and the cover 3 is not moved since the cover 3 is locked by the lock member 4. On the other hand, when the locking spring 4b and the lock member 4 have not been correctly incorporated and the lock member 4 has not returned to the lock position, the cover 3 is moved to the open position, and the photoelectric switch 18 is closed.

Thereafter, the lock releasing pin 15 is again moved forth to push the lock member 4 to the releasing position, and with the lock member 4 held in the releasing position, the cover opening plate 17 is again moved up and down to once push the cover 3 to the open position and then release it. At this time, if the cover 3 and the closing spring 3a have been correctly incorporated in the casing body 2, the cover 3 returns to the closed position under the force of the closing spring 3a when the cover opening plate 17 release the cover 3. Otherwise, the cover 3 cannot return to the closed position. Then, the position detecting means 13 operates to detect whether the cover 3 has returned to the closed position. That is, when the cover 3 is not in the closed position, the photoelectric switch 13a is opened. Further, when the cover 3 has not been mounted on the casing body 2, both the photoelectric switches 13a and 13b are kept closed.

The check on the function of the cover 3 described above can be effected during the step of taking up the magnetic tape 5 in the manufacturing process of the cassette by the use of the holding means 20. That is, when the cover 3 is brought to the open position by the cover opening means 12, the holding means 20 is moved toward the casing body 2 so that the lever 21 abuts against the lower side of the cover 3 to hold the cover 3 in the open position after the cover opening means 12 releases the cover 3. While the cover 3 is held in the open position by the holding means 12, predetermined tape take-up operation is effected and the cover opening plate 17 is moved upward to the position shown in FIG. 2. Thereafter, the holding means 20 is moved away from the cover 3 and the cover opening plate 17 is moved downward to permit the cover 3 to move to the closed position. At this time, it is preferred that the cover opening plate 17 be slowly moved downward so that the cover 3 gently moves to the closed position not to damage the magnetic tape 5.

Figure 3:
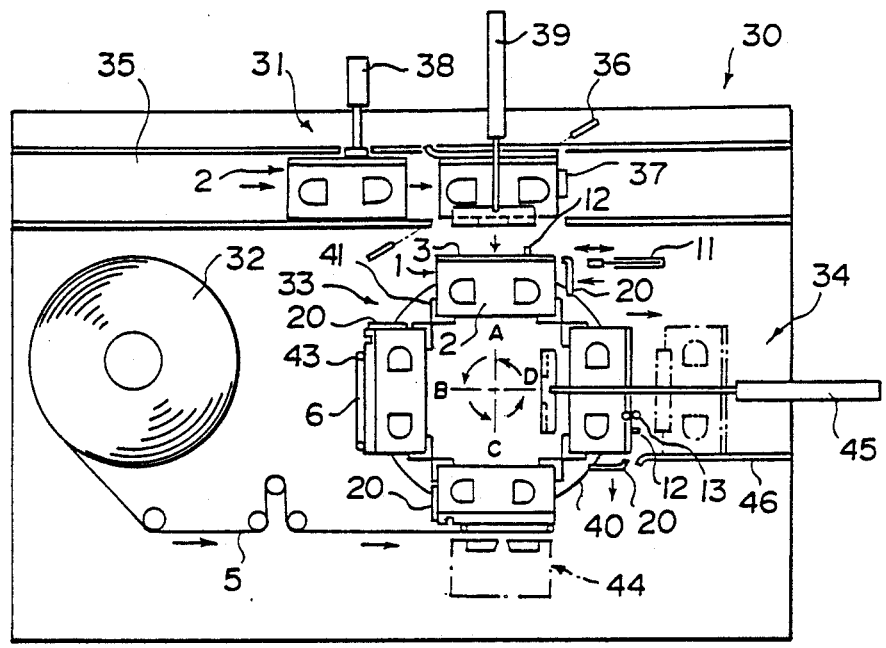
FIG. 3 is a plan view showing a tape take-up system provided with a magnetic tape cassette checking system of the present invention.

FIG. 3 shows a magnetic tape take-up system 30 provided with the checking system 10 shown in FIGS. 1 and 2.

The take-up system 30 comprises a casing supply section 31 which supplies a casing body 2 having therein a pair of reels with a leader tape being wound therearound, a tape winding section 33 which winds magnetic tape 5 supplied from a tape supply roll 32 around one of the reels in the casing body 2 supplied, and a discharge section 34 which discharges the casing body 2 having been provided with the tape 5. The checking system 10 is disposed in the tape winding section 33.

When a photoelectric switch 36 detects the casing body 2 fed to the supply section 31 by a conveyor 35, a stopper 37 is moved upward to stop the casing body 2. The casing body immediately after the casing body stopped by the stopper 37 is held there by a clamp 38. The casing body stopped by the stopper 37 is pushed into the tape winding section 33 by an insertion cylinder 39.

The tape winding section 33 includes an index table 40 which is intermittently rotated by 90° each time. The index table 40 is provided with four positioning members 41, and each positioning member 41 is successively fed to stations A to D carrying the casing body 2. The stations A to D are arranged at intervals of 90°. The casing body 2 pushed into the tape winding section 33 is inserted into the positioning member 41 stopped at the station A. At the station A, the cover 3 of the casing body 2 is opened and held in the open position by the holding means 20 provided on the index table 40 for each positioning means 41.

Figure 4:
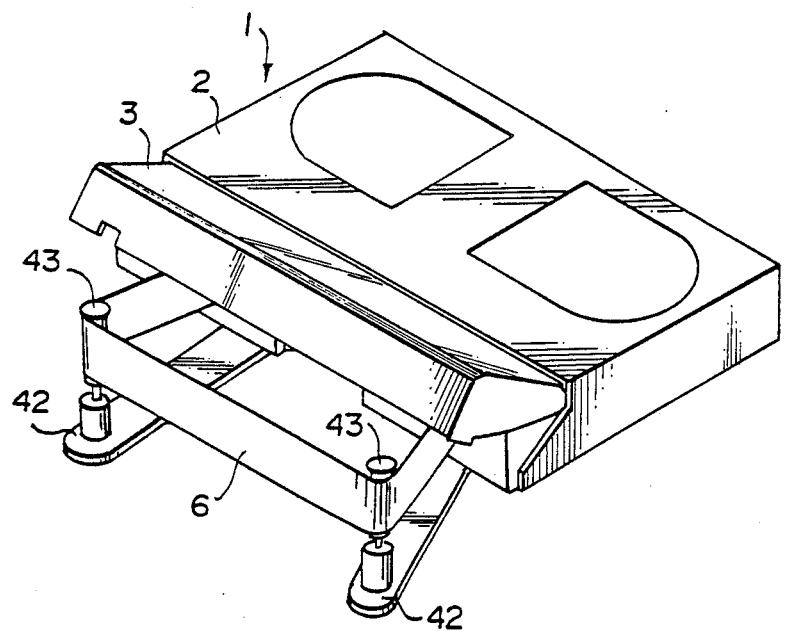
FIG. 4 is a perspective view for illustrating the operation of the drawing levers employed in the tape take-up system.

At the station B, the leader tape 6 is drawn from the casing body 2, and in order to prepare for winding the magnetic tape 5, the leader tape 6 is taken up by an appropriate amount and centered to facilitate connection of the leader tape 6 to the magnetic tape 5 at a predetermined part. The leader tape 6 is drawn from the casing body 2 by pulling the leader tape 6 with pins 43 on a pair of drawing levers 42 by rotating the drawing levers 42 as shown in FIG. 4. Further, the leader tape 6 is centered by a pulse motor (not shown) adapted to be engaged with the reels.

At the station C, the leader tape 6 is cut, and one of the cut ends is spliced to one end of the magnetic tape 5 supplied from the supply roll 32. Then a predetermined length of the magnetic tape 5 is take up around the reel to which said one cut end is connected, and then the magnetic tape 5 is cut. The cut end of the magnetic tape 5 taken up around the reel is spliced to the other cut end of the leader tape 6. These cutting and splicing operations are accomplished by a cutting and splicing device 44 disposed near the index table 40 and the magnetic tape 5 is taken up around the reel by the use of a suitable driving motor. Since these operations can be accomplished in accordance with known methods disclosed in Japanese Unexamined Patent Publication Nos. 58(1983)-175172, and 61(1986)-254449, for example, and will not be described in detail here.

At the station D, the part of the leader tape 6 and magnetic tape 5 outside the casing body 2 is taken up, and the holding means 20 is moved away from the cover 3 to permit it to move the closed position. After the cover 3 is closed, a discharge cylinder 45 of the discharge section 34 discharges the casing body 2 outside the tape take-up system 30 along a guide member 46.

The lock releasing means 11 of the checking system 10 is disposed near the station A, and the position detecting means 13 is disposed near the station D. Since the cover 3 is opened at the station A and closed at the station D in the tape take-up system 30, a pair of cover opening means 12 are provided, one near the station A and the other near the station D.

Though the lock releasing means 11 and the cover opening means 12 are driven by cylinders in the embodiment described above, they may be driven other driving means such as one using a cam. Further, the position detecting means 13 may comprise optical means, mechanical means, magnetic means, electrical means or the like other than the photoelectric switches 13a and 13b.

Further, by employing the tape take-up system 30 including the index table 40 shown in FIG. 3, the tape take-up operation and the operations before and after the tape take-up operation can be effected in parallel and accordingly the cycle time of the tape take-up step can be shortened. Further, by incorporating the cassette checking system 10 in the tape take-up system 30, the check on the function of the cover 3 can be effected simultaneously with the tape take-up step without separately providing a checking step.

I claim:

1. A method of checking a videotape cassette for opening and closing function of a cassette cover which is mounted on a cassette casing to be movable between a closed position and an open position and is urged toward the closed position by a closing spring, the cassette casing being provided with a lock mechanism having a lock member which is movable between a locking position in which it is engaged with the cassette cover in the closed position to lock the cassette cover to the closed position, and a lock releasing position in which it releases the cassette cover, and a locking spring which normally urges the the lock member toward the locking position, said method comprising steps of urging the lock member toward the lock releasing position, releasing the lock member, urging the cover toward the open position, releasing the cover, subsequently detecting the position of the cover, urging the lock member to the lock releasing position, bringing the cover to the open position with the lock member held in the lock releasing position, releasing the cover and detecting the position of the cover.

* * * * *